United States Patent
Cheng et al.

(10) Patent No.: US 6,869,230 B2
(45) Date of Patent: Mar. 22, 2005

(54) ASSEMBLY FOR HIGH-SPEED OPTICAL TRANSMITTER OR RECEIVER

(75) Inventors: Kwok Sing Cheng, New Territories (HK); Yeung Ming Alice Chow, New Territtories (HK); Wai Ming Edwin Cheung, Tai Po (HK); Fuk Kay Franklin Tong, New Territories (HK); Hing Wa Flora Ho, Kowloon (HK); Allan Hui, Shatin (HK); Nelson Lau, Kowloon (HK); Ka Suen Lee, Kowloon (HK); Chi Hung Lin, Kowloon (HK); Chi Yue Raymond Cheung, Kowloon (HK); Chun Wah Colin Fan, Pokfulam (HK)

(73) Assignee: SAE Magnetics (Hong Kong) (HK)

( * ) Notice: Subject to any disclaimer, the term of this patent is extended or adjusted under 35 U.S.C. 154(b) by 0 days.

(21) Appl. No.: 10/609,382

(22) Filed: Jul. 1, 2003

(65) Prior Publication Data

US 2004/0136660 A1 Jul. 15, 2004

Related U.S. Application Data

(60) Provisional application No. 60/392,939, filed on Jul. 2, 2002.

(51) Int. Cl.$^7$ .................................................. G02B 6/42
(52) U.S. Cl. .............................................................. 385/88
(58) Field of Search ...................................... 385/88–94

(56) References Cited

U.S. PATENT DOCUMENTS

| | | | | |
|---|---|---|---|---|
| 4,756,590 A | * | 7/1988 | Forrest et al. ................ | 385/89 |
| 5,121,457 A | * | 6/1992 | Foley et al. .................. | 385/89 |
| 5,764,836 A | * | 6/1998 | Roff ............................. | 385/88 |
| 6,217,231 B1 | * | 4/2001 | Mesaki et al. ................ | 385/88 |
| 6,293,711 B1 | * | 9/2001 | Sasaki .......................... | 385/88 |
| 6,315,464 B1 | * | 11/2001 | Plickert et al. ............... | 385/89 |
| 6,529,650 B1 | * | 3/2003 | Tsuru ........................... | 385/14 |
| 6,641,308 B2 | * | 11/2003 | Nobuhara et al. ............ | 385/84 |
| 6,792,178 B1 | * | 9/2004 | Zhou ............................ | 385/31 |

* cited by examiner

*Primary Examiner*—Akm Enayet Ullah
*Assistant Examiner*—Jerry T Rahll
(74) *Attorney, Agent, or Firm*—Swidler Berlin LLP (57) ABSTRACT

An optical assembly is provided that is capable of high speed operation using a vertical cavity laser such as a vertical cavity surface emitting laser (VCSEL). The optical assembly is configured to have a small form factor and uses an angled surface of an embedded fiber to internally reflect a beam from the VCSEL along the length of the fiber. The angled surface is coated to ensure that a small portion of the beam is transmitted through the fiber out of the angled surface into a monitoring diode. This geometry provides high coupling efficiency and facilitates direct active alignment between the fiber and the VCSEL.

14 Claims, 7 Drawing Sheets

ASSEMBLY FOR HIGH-SPEED OPTICAL TRANSMITTER OR RECEIVER

CROSS REFERENCE TO RELATED APPLICATIONS

This application claims priority to provisional patent application No. 60/392,939 filed Jul. 2, 2002.

FIELD OF THE INVENTION

The present invention relates generally to assemblies for converting between electrical and optical signals and, more particularly, to a compact, high speed transmitter and receiver optical assembly and methods of manufacturing pertaining thereto.

BACKGROUND OF THE INVENTION

Optical fiber technology is well suited for communications applications because optical fibers have a wide transmission bandwidth and relatively low attenuation. However, optical fiber interfaces to electronic and optical networks are expensive to manufacture because of the difficulty associated with mounting laser transmitting and receiving devices onto substrates and aligning them with separately mounted optical fibers. Additionally, high performance applications of optical fiber technology present integration challenges, particularly at optical-electrical boundaries, from cost, technological and miniaturization perspectives. For these reasons, fiber optic interfaces have been a barrier that has slowed the penetration of fiber optic technology into local metropolitan area communication systems and other markets.

Conventional interfaces, such as transmitter optical sub-assembly (TOSA) and receiver optical sub-assembly (ROSA) interfaces for high speed applications have had a relatively large footprint and have not incorporated cost effective technologies, such as vertical cavity surface emitting lasers (VCSELs). Rather, conventional TOSA/ROSA packages have incorporated edge emitting laser technologies. For example, a package design known as a butterfly package is in wide use today for TOSA/ROSA applications. The butterfly packages does not permit the use of VCSEL technology, is relatively large and does not incorporate electrically conductive signal traces and RF design features which would allow this package to operate at high speeds.

Accordingly, there is a need for a compact optical assembly that operates in the high-speed arena. There is a further need for a compact optical assembly that incorporates VCSEL technology and RF design features that permit high speed operation. There is a further need for a serial optical assembly that is easy to manufacture, assemble and use that can incorporate off the shelf components to achieve a low overall cost of manufacture and deployment. There is still a further need for an assembly that deploys VCSEL technology in the high-speed arena, such as 10 Gigabit per second serial applications.

SUMMARY OF THE INVENTION

According to the present invention, an optical assembly is provided that is capable of high speed operation using a vertical cavity laser such as a vertical cavity surface emitting laser (VCSEL). The optical assembly is configured to have a small form factor and uses an angled surface of an embedded fiber to internally reflect a beam from the VCSEL along the length of the fiber. The angled surface is coated to ensure that a small portion of the beam is transmitted through the fiber out of the angled surface into a monitoring diode. This geometry provides high coupling efficiency and facilitates direct active alignment between the fiber and the VCSEL.

According to one embodiment of the invention, the assembly may be used as compact transmitter optical sub-assembly (TOSA) and receiver subassembly (ROSA) for high-speed (10 gigabit per second) transmission using vertical cavity surface emitting laser (VCSEL). The assembly may be used, for example, in applications compliant with the 10 Gigabit Small Form Factor Pluggable (XFP) design.

According to another embodiment of the invention, the optical assembly includes a platform and a ferrule. The platform supports a semiconductor device that includes a vertical cavity laser. The platform also electrically couples the semiconductor device to RF signals. The ferrule has a mating end and an optical fiber mounted therein. The mating end of the ferrule has angled ferrule and fiber surfaces that are coplanar. The mating end further includes mating surfaces that engage end surfaces of the platform to align the laser relative to the fiber so that the laser is positioned to project a beam into the fiber. During use, the laser beam is projected into the fiber, reflects off of the angled surface and propagates along the fiber.

The angled surface may be coated with a dielectric having a constant chosen to cause both internal reflection of the beam and transmission of a small portion of the beam at the angled surface of the fiber. The assembly may include a monitoring diode secured to the platform in the path of the transmitted portion of the beam to monitor the operation of the VCSEL.

According to another embodiment of the present invention, the assembly may further include a sleeve and a housing. The sleeve holds the ferrule. The housing includes a passageway for engaging the sleeve and a cavity for enclosing the mating end of the ferrule and the platform. The signals of the assembly may be coupled to the semiconductor device through leads supported by the platform. Additionally, the housing may include a slot through which the leads protrude and are secured using a material having a low dielectric constant.

According to an embodiment of a method of the present invention, a ferrule is provided having an internal longitudinal hole. An optical fiber is secured within the longitudinal hole. The ferrule and the fiber are machined to create a coplanar angled surface. The ferrule is further machined to create mating surfaces for engaging a platform and positioning the fiber relative to a device on the platform. During use, the properly aligned device transmits a light beam into the fiber that reflects off of the angled surface of the fiber and propagates along the fiber.

BRIEF DESCRIPTION OF THE FIGURES

The above described features and advantages of the present invention will be more fully appreciated with reference to the detailed description and accompanying figures, which present illustrative embodiments that are not intended to limit the invention.

DETAILED DESCRIPTION

According to the present invention, an optical assembly is provided that is capable of high speed operation using a vertical cavity laser such as a vertical cavity surface emitting laser (VCSEL). The optical assembly is configured to have a small form factor and uses an angled surface of an embedded fiber to internally reflect a beam from the VCSEL along the length of the fiber. The angled surface is coated to ensure that a small portion of the beam is transmitted through the fiber out of the angled surface into a monitoring diode. This geometry provides high coupling efficiency and facilitates direct active alignment between the fiber and the VCSEL.

According to one embodiment of the invention, the assembly may be used as compact transmitter optical subassembly (TOSA) and receiver subassembly (ROSA) for high-speed (10 gigabit per second) transmission using vertical cavity surface emitting laser (VCSEL). The assembly may be used, for example, in applications compliant with the 10 Gigabit Small Form Factor Pluggable (XFP) design. The assembly may be housed within a housing that is small and easy to connect fiber optics and electrical connectors to.

Figure 1:
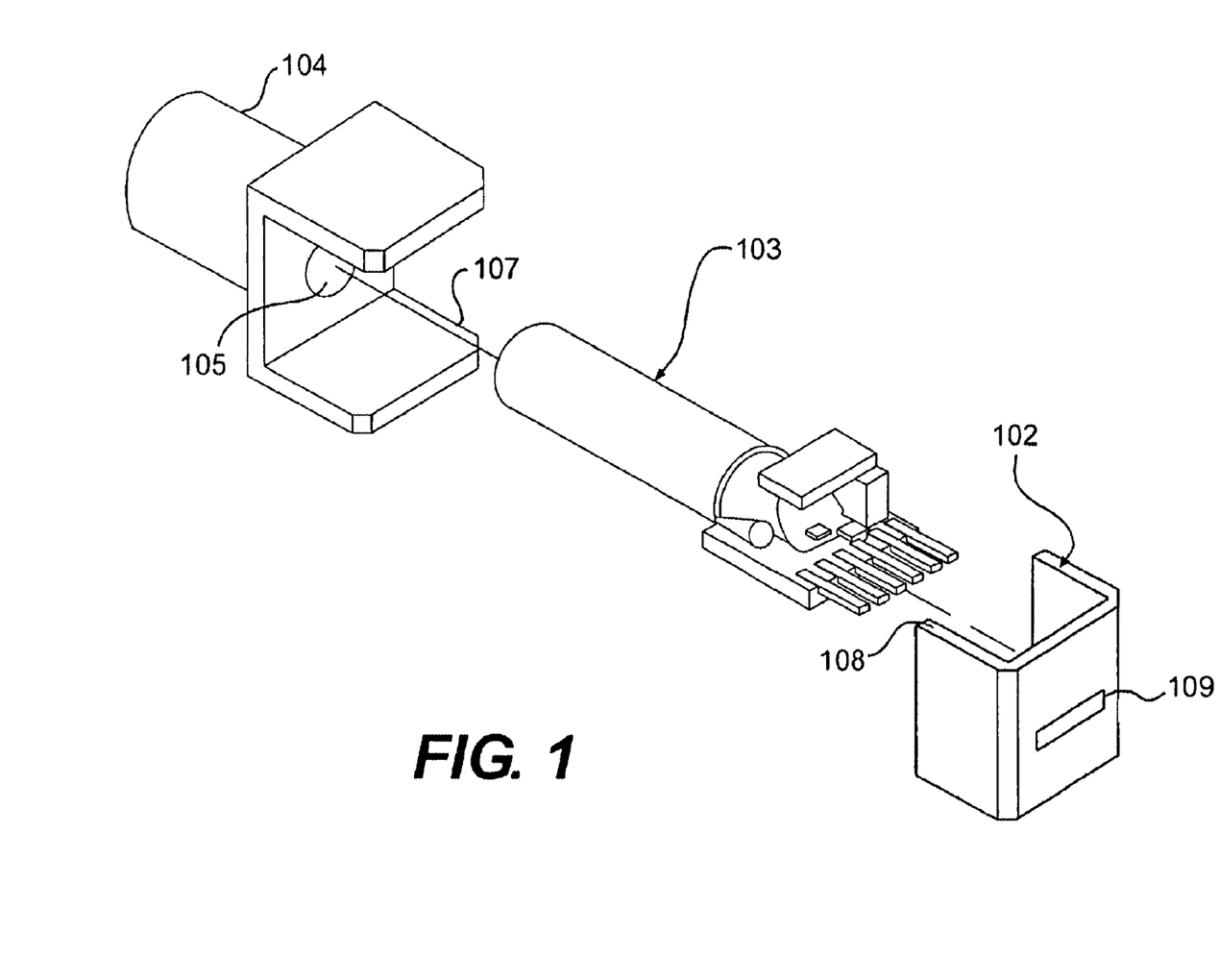
FIG. 1 depicts an exploded view of an assembly for a TOSA or ROSA interface according to an embodiment of the present invention.

FIG. 1 depicts an exploded view of an assembly for a TOSA or ROSA interface according to an embodiment of the present invention. Referring to FIG. 1, the assembly includes a housing that has two separate pieces 101 and 102. The housing 101 includes a hollow cylindrical portion 104 that defines an internal passageway 105. The internal passageway is used to receive and mount a sleeve 103 that holds a ferrule assembly 106. The ferrule assembly 106 is described in more detail with reference to FIG. 2, however, it should be noted that the ferrule assembly includes the active optical and electronic components that are coupled to the optical fiber at one end and to RF signal leads at the other.

The housing 101 may include walls 107 that define all or a portion of a cavity that the passageway 105 joins. The walls 107 may also be walls that mate with opposing mating walls 108 on the housing part 102 to create an enclosed cavity that accommodates the ferrule assembly 106. The housing part 102 may include a wall 108 that defines a slot 109. The slot 109 may be positioned in relation to electrical leads 207 (shown in FIG. 2) so that the leads protrude through the slot 109.

When assembled, the sleeve 103 of the ferrule assembly 106 may be lodged and fastened within the passageway 105 of the housing part 101. The housing, part 101 and 102 may then be brought together so that the leads 207 protrude through the slot and so that the mating walls 107 and 108 create an enclosed cavity that surrounds the ferrule assembly 106. The housing parts may be sealed using an epoxy resin or solder. The assembly may apply the same compact outer casing (101+102) for a transmitter optical subassembly (TOSA) and receiver optical subassembly (ROSA), however this is not a requirement.

Figure 2:
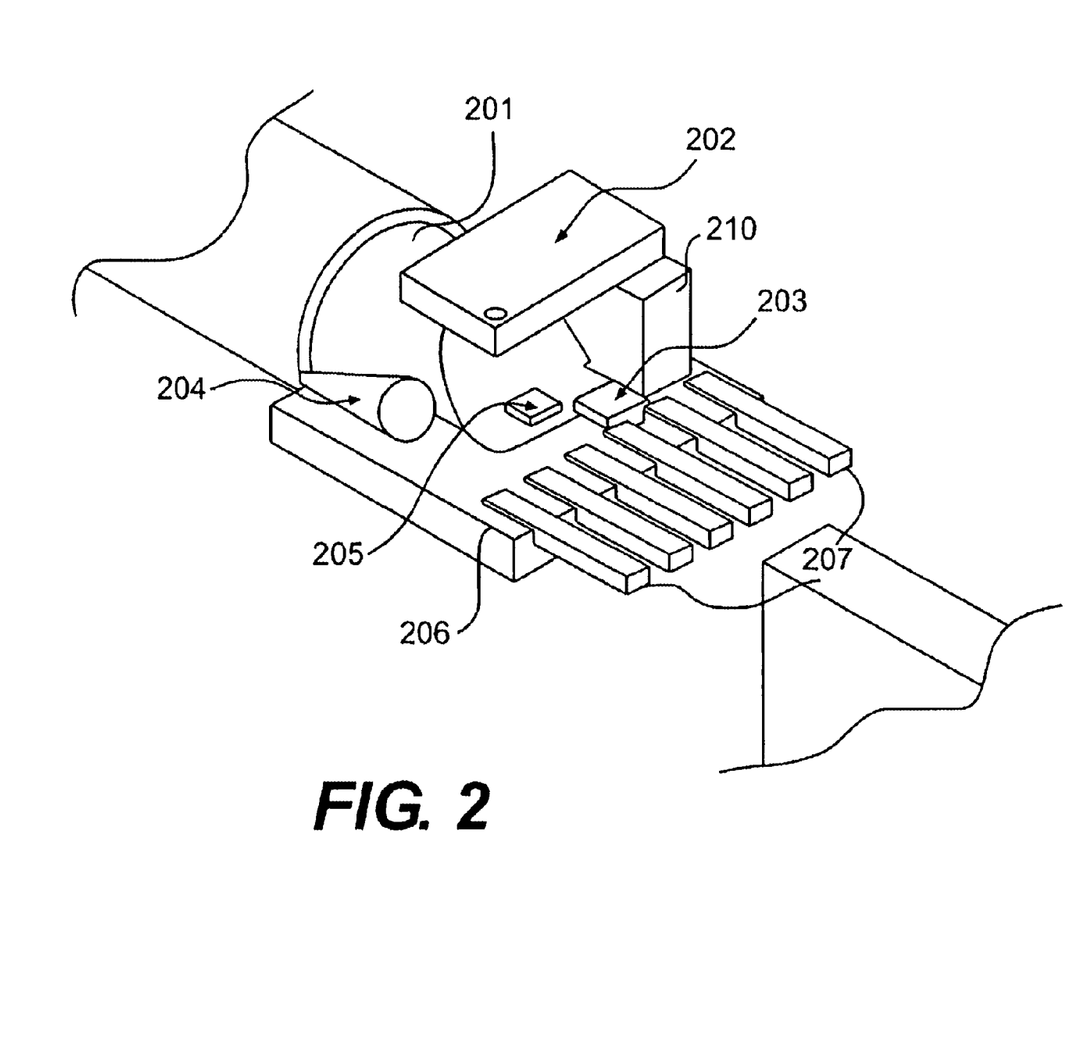
FIG. 2 depicts an illustrative example of a TOSA assembly illustrating the interaction between the ferrule and elements on the platform according to an embodiment of the present invention.
Figure 3:
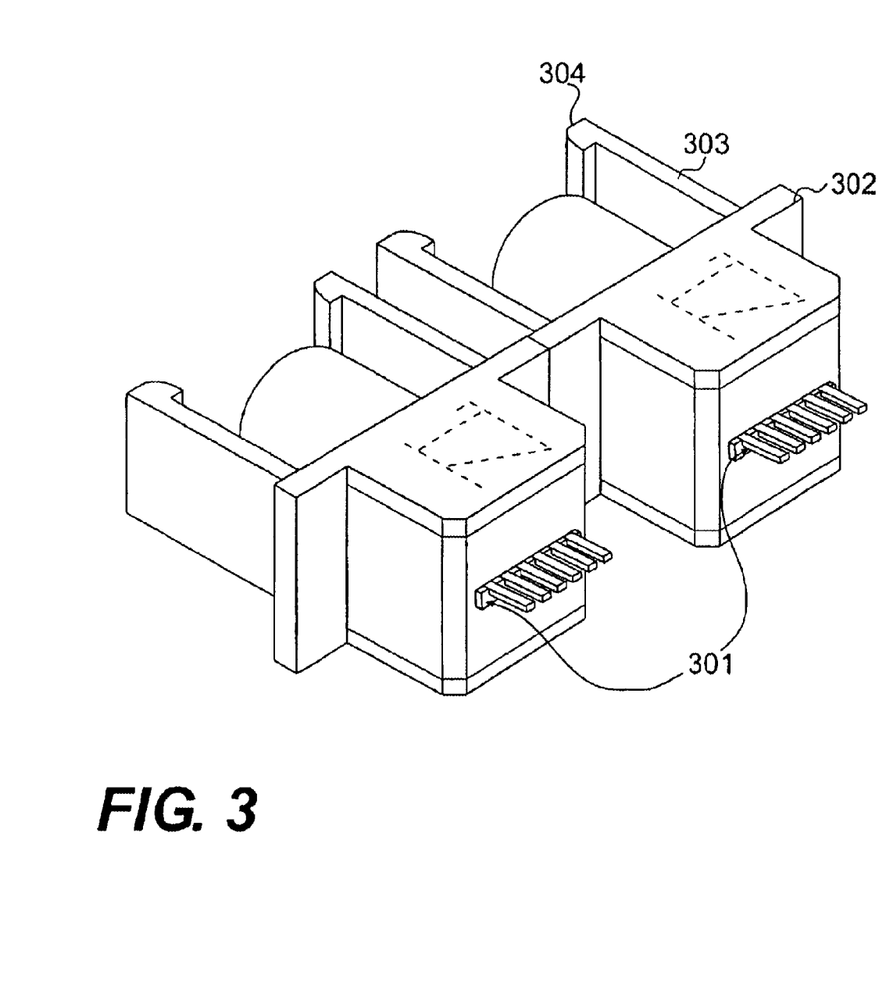
FIG. 3 depicts a view of assembled TOSA/ROSA interfaces in their respective housings according to an embodiment of the present invention.

FIG. 3 depicts a view of assembled TOSA/ROSA interfaces in their respective housings according to an embodiment of the present invention. The resulting size of the assembly may be about 30% the volume of the so-called butterfly package currently used in optical transmitter and receiver applications. Referring to FIG. 3, the slot 109 in the capping out casing 102 illustrated in FIG. 1 may be filled with a low dielectric constant material, such as polyamide or acrylic. The low dielectric material fills in between the electrical pins 207 (shown in FIG. 2) and the slot providing rigidity to the leads which facilitates interconnection with an electrical signal connector. Moreover, the low dielectric material allows the leads 207 to be placed relatively close together, for example 0.4 microns apart, without causing excessive capacitive coupling between leads. A high dielectric constant material would tend to make the transmission line characteristics of the leads undesirable for high-frequency RF signaling applications.

FIG. 3 further illustrates a case where the housing 300 includes convenient features for facilitating interconnection with optical signaling paths. For example, the wall 302 may be extended beyond the walls that define the cavity. In addition, walls 303 may be positioned on the wall 302 and may include tabs 304. The tabs 304 may be used to facilitate mating another optical fiber interface with the housing 300. The tabs 304 may interlock with mating tabs or other features of a mating optical fiber.

The compact size of the package may be accomplished by putting all of the electrical and optical components on a platform inside the now-smaller casing. This is made possible through the creation and implementation of a specially configured ferrule (201). The ferrule may be chiseled with 45-degree plane that is covered with a special coating to enable 90-degree reflection of the light going into/out of the fiber and transmission of a portion of the light. The length of the ferrule may also be shortened over conventional designs to realize a more compact overall subassembly size (see FIG. 4a). Any convenient ferrule may be acquired in the commercial market and customized according to embodiments of the present invention.

FIG. 2 depicts an illustrative example of a TOSA assembly illustrating the interaction between a ferrule, a platform and components on the platform according to an embodiment of the present invention. Referring to FIG. 2, which depicts a TOSA, the sleeve 103 houses a ferrule 201. Prior to describing FIG. 2 in detail, the ferrule 201 and its mating relationship with the platform 206 is shown and described relative to FIGS. 4 and 5.

Figure 4A:
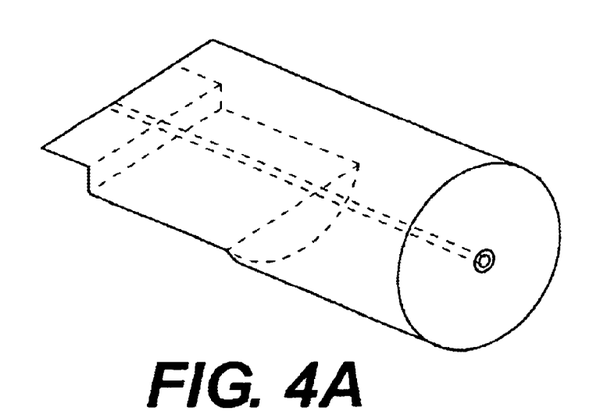
FIGS. 4A–4C depict an embodiment of the ferrule according to an embodiment of the present invention.
Figure 4B:
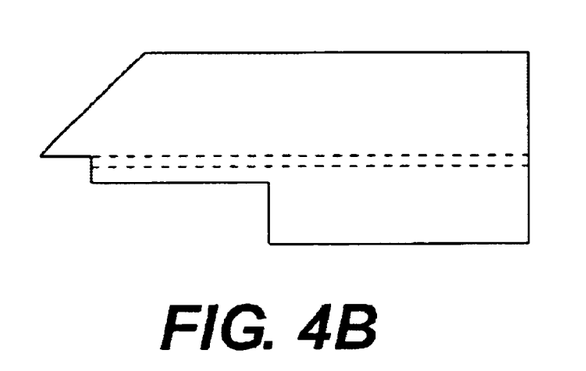
Figure 5:
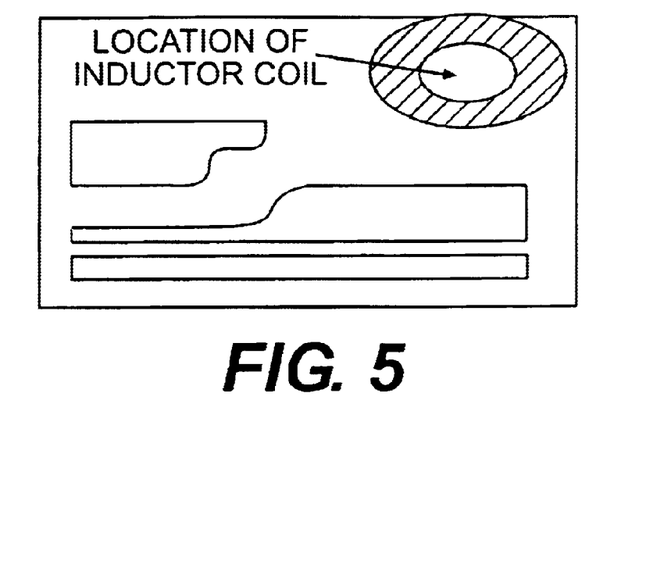
FIG. 5 depicts RF signal traces on the platform and an inductor element according to an embodiment of the present invention.

FIG. 4A depicts view of the ferrule 201 which highlights a longitudinal hole 400 in the ferrule 201. The hole is sized to accommodate and secure an optical fiber within it. The optical fiber may be mounted by threading an optical fiber into the hole and securing it in place with an epoxy resin or any other appropriate adhesive. The ferrule 201 also includes an angled surface 401 and mating surfaces 402–405 which are best illustrate with reference to FIG. 4B. Referring to FIG. 4B, the ferrule includes an angled surface 401. The angled surface 401 may be formed before or after the optical fiber is secured within the ferrule 201. In general, the angled surface 401 may be formed by grinding and optionally polishing the surface of the ferrule 201 and optical fiber within the ferrule 201 to a predetermined angle relative to the longitudinal axis of the ferrule. The angle may be any convenient angle that reflects light from within the optical fiber back into the fiber and along the longitudinal axis of the fiber.

The ferrule may also be cut and/or ground to shorten the overall length of the ferrule and to create mating surfaces 402 to 405 on the ferrule as illustrated by way of example in FIG. 4B. The surface 402 is perpendicular to the longitudinal axis of the ferrule. The surface 403 is parallel to the longitudinal axis. The surfaces 402 and 403 may be designed to be mating surfaces that engage opposing surfaces of the platform to properly align the angled surface 401 of the mating end of the optical fiber within the ferrule 201 and an optical device on the platform.

Figure 4C:
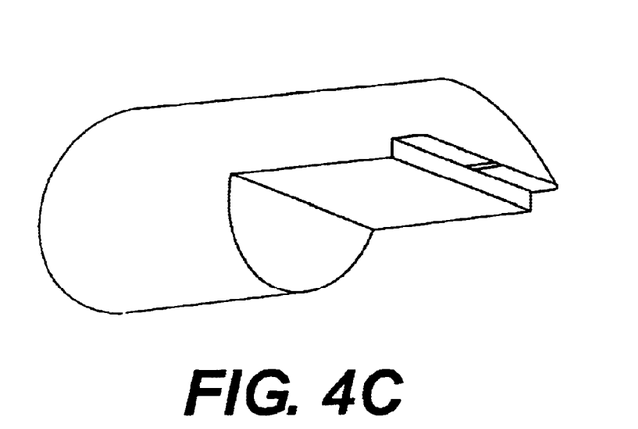
Figure 9:
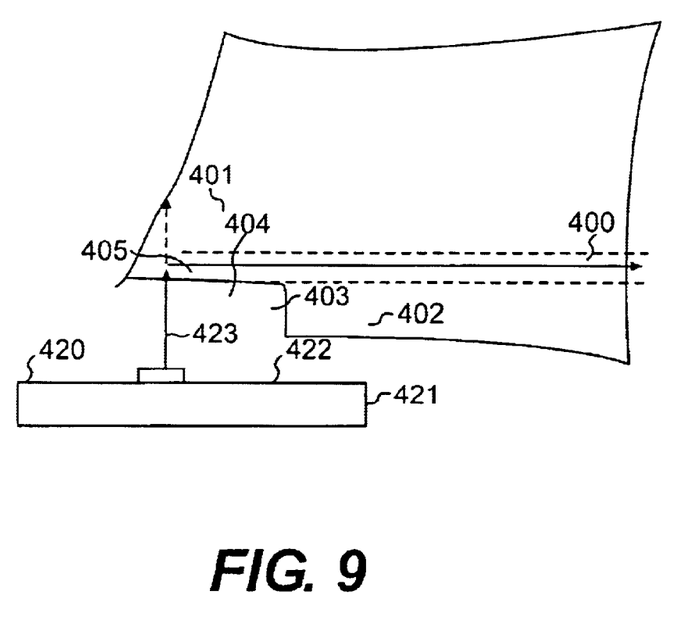
FIG. 9 depicts a platform and its relationship with the ferrule during engagement according to an embodiment of the invention.

FIG. 9 depicts a platform 420 and its relationship with the ferrule during engagement. Referring to FIG. 9, the platform 420 includes mating surfaces 421 and 422 that engage the mating surfaces 402 and 403 respectively of the ferrule. The dimensions of the surfaces 402 and 403 are designed to ensure proper engagement and proper longitudinal alignment between the optical fiber 403, its angled surface 401 and an optical element 423 only the platform. The optical element 423 on the platform may be a VCSEL or an optical receiver element such as a high-speed photo-diode depending on whether the platform is configured to implement a TOSA or a ROSA interface. The surface 404 is generally selected to ensure clearance between the optical element 423 on the platform and the optical fiber within the ferrule. The optical fiber within the ferrule generally is exposed along surface 405 between surfaces 404 and 401. During use of the properly aligned platform, light is communicated between the optical fiber and the optical element 423 on the platform as shown in FIG. 9 for a TOSA. For a ROSA, the direction of the light beam is reversed. FIG. 4C depicts an another view of the ferrule according to an embodiment of the present invention.

Referring again to FIG. 2, the platform is shown with mating surfaces engaged with the mating surfaces of the ferrule. In the case of a TOSA, a laser diode 205, here a high-speed (10 gigabit per second) vertical cavity surface emitting laser (VCSEL), emits light vertically up into the fiber through the bottom of the fiber towards the angled surface 401. The angled surface may be a 45-degree ferrule surface covered with a special coating of a precisely controlled reflective index to allow a portion of the light to be reflected at the angled surface. The reflected light travels along the optical fiber. The coating also gives rise to a portion of light which is transmitted through the fiber, out of the surface 401 and toward a monitoring photodiode.

The monitoring photo diode may be located at the bottom of a construct 202 and aligned with the transmission path of a beam of light originating with the VCSEL. The construct 202 may be a device which includes the photodiode that is further coupled to the platform through a standoff 210. The standoff 210 may be fastened to the platform in any convenient manner including through the use of an adhesive. The monitoring photodiode device may be adhered to the standoff and electrically coupled to the platform by wirebonding or flip chip bonding to the platform directly or indirectly through the standoff.

The platform may incorporate a thermistor 203 to detect the temperature of the assembly during operation. An inductor 204 may be a broadband inductor coil that is put with the larger end facing the electrical pin-outs (207). The high-speed ground-signal-ground transmission line layout (206) may be implemented to facilitate coplanar waveguide-coplanar strip transition, with grounding impedance match close to 100 micron-meters. In order to accommodate the inductor coil on the same plane inside the casing, a wiring scheme on the platform such as that depicted in FIG. 5 may be implemented. This configuration frees up space into which to place the inductor.

The leads 207 may be coupled to signal traces on the platform that are incorporated in the form of a lead frame on the platform. The leads 207 may be driven by a high-speed transceiver chip to facilitate high speed 10 Gigabits per second operation through a serial path. Chips are available from Broadcom are available for properly driving the leads 207 from external components.

Elements used in the assembly, including the inductor, VCSEL laser, monitoring photodiode, thermistor and, with some customized work, the ferrule can all be purchased in the commercial market, which contributes to achieving low overall cost.

In the case of a ROSA, the design layout is roughly similar in that a capacitor will replace the inductor at 204, and a transimpedance amplifier (TIA) would substitute the thermistor at the same 203 location. A high-speed photodiode will also replace the monitoring photodiode at 205, now that the VCSEL diode is absent.

Figure 6:
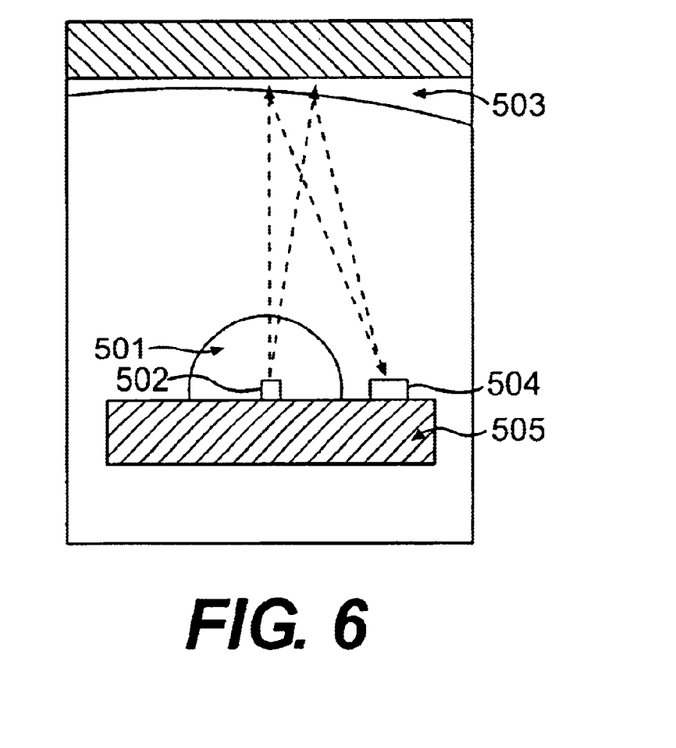
FIG. 6 depicts a platform—ferrule layout for a TOSA that facilitates mounting an optical monitoring device on the platform according to an embodiment of the present invention.

FIG. 6 depicts a platform—ferrule layout for a TOSA that facilitates mounting an optical monitoring device on the platform according to an embodiment of the present invention. Referring to FIG. 6, an alternative embodiment is presented pursuant to which one aims to make use of lensing to achieve co-location of a laser diode 502 and a monitoring photodiode 504 on the same platform. The platform may be a ceramic plane 505.

The ferrule 501 includes an angled surface 401 that reflects a portion of the beam toward a concave mirror 503. The concave mirror 503 may be cast-molded into the inner upper side of the housing (102). This design may facilitate assembly with fewer components as a separate standoff is note needed with this design.

Figure 7:
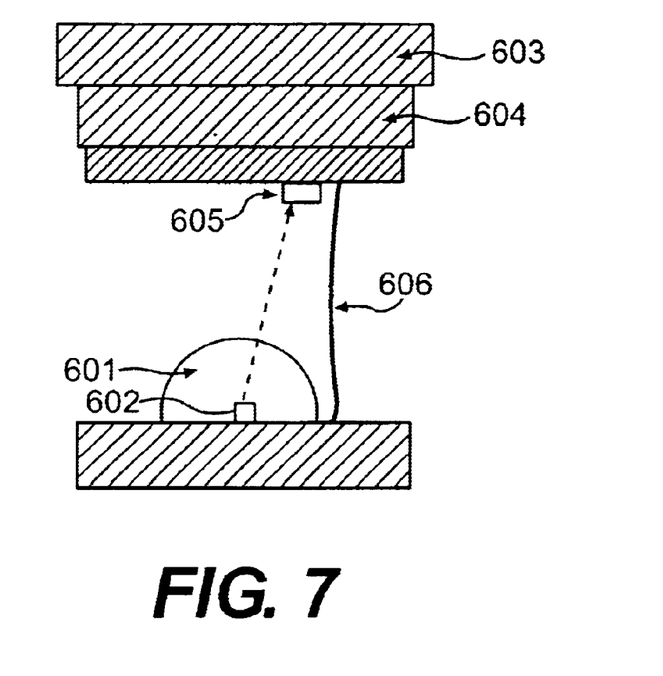
FIG. 7 depicts a platform—ferrule layout for a TOSA that facilitates mounting an optical monitoring to the housing according to an embodiment of the present invention.

FIG. 7 depicts a platform—ferrule layout for a TOSA that facilitates mounting an optical monitoring to the housing according to an embodiment of the present invention. Referring to FIG. 7, the alternative embodiment shown aims to tolerate a larger monitoring photodiode 605, which is now located at the bottom of the inner upper side of the back housing 603, 102. Most of the suitable monitoring photodiodes in the commercial market have footprint larger than 1 mm×1 mm, a dimension required that is difficult to avoid depending on the embodiment. To prevent grounding, an electricity-insulating layer 604, which may be, e.g. ceramic, is sandwiched between the back housing and the monitoring diode.

The monitoring diode may be connected to the high-speed transmission lines via a metal wire (gold, copper, or flex cable). Again, a standoff will not be needed in the design, and the special coating at the angled surface of the ferrule (601) plays the role in splitting part of the light going into/out of the fiber toward the monitoring photodiode.

Figure 8:
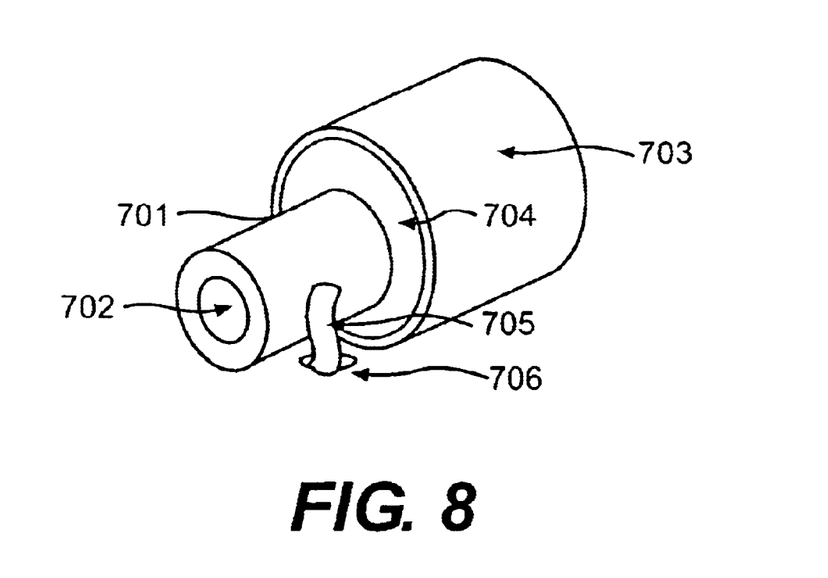
FIG. 8 depicts a technique for shielding the ferrule according to an embodiment of the present invention.

FIG. 8 depicts a technique for shielding the ferrule according to an embodiment of the present invention. To manage the resonance issues in a small cavity, a grounded metallic shield for the ferrule (702) may be implemented. According to one embodiment, this may be made of ceramic. A metal shield (701) may be coated onto the ceramic, and the space between the sleeve (703) and the ferrule may be sealed with metal (704) as well. As the ferrule is suspended in the air and not touching the substrate, the ferrule is grounded via an electricity-conducting epoxy strip (705) that connects the ferrule shield and a small veer hole on the substrate board. The ceramic ferrule is thus insulated from resonance with this grounded metal shielding setup.

While specific embodiments of the present invention have been shown and described, it will be understood by those having ordinary skill in the art that changes may be made to those embodiments without departing from the spirit and scope of the present invention.

What is claimed is:

1. An optical assembly comprising:
   a platform for supporting a semiconductor device that includes a vertical cavity laser, the platform electrically coupling the semiconductor device to signals; and
   a ferrule having an optical fiber therein and a mating end with angled ferrule and fiber surfaces that are coplanar and with mating surfaces that engage end surfaces of the platform to align the laser relative to the fiber so that the laser is positioned to project a beam into the fiber for reflection off of the angled surface and propagation along the fiber.

2. The assembly according to claim 1, further comprising:
   a monitoring diode supported by and electrically coupled to the platform, the monitoring diode being positioned to receive portions of the beam transmitted through the angled surface of the fiber.

3. The assembly according to claim 1, further comprising:
   a sleeve holding the ferrule; and
   a housing including a passageway for engaging the sleeve and a cavity for enclosing the mating end of the ferrule and the platform.

4. The assembly according to claim 3, wherein the signals are coupled to the semiconductor device along leads supported by the platform.

5. The assembly according to claim 4, wherein the housing includes a slot through which the leads protrude.

6. The assembly according to claim 5, wherein the housing comprises a housing portion and a cap portion,
   the housing portion including a passageway opening to mating walls defining at least a portion of the cavity; and
   the cap portion including a slot wall defining the slot and opposing mating walls for mating with the mating walls, the opposing mating walls engaging the mating walls to enclose the cavity.

7. The assembly according to claim 6, further comprising epoxy within the slot that secures the leads.

8. The assembly according to claim 7, wherein the epoxy has a low dielectric constant.

9. The assembly according to claim 1, further comprising an inductor element electrically coupled to the platform.

10. The assembly according to claim 9, wherein the platform includes signal traces along a mounting surface for coupling signals to the semiconductor device, the signal traces being positioned to define a region without signal traces upon which to position the inductor.

11. A method of making an optical assembly, comprising:
    providing a ferrule with an internal longitudinal hole;
    securing an optical fiber within the longitudinal hole;
    machining the ferrule and the fiber to create a coplanar angled surface;
    machining the ferrule to create mating surfaces for engaging a platform and positioning the fiber relative to a device on the platform to permit the device to transmit a light beam into the fiber that reflects off of the angled surface of the fiber and propagates along the fiber.

12. The method according to claim 11, further comprising:
    coating the angled surface with a dielectric material.

13. The method according to claim 12, wherein the dielectric material is polyamide.

14. The method according to claim 12, wherein the dielectric material is acrylic.

* * * * *

UNITED STATES PATENT AND TRADEMARK OFFICE
CERTIFICATE OF CORRECTION

PATENT NO. : 6,869,230 B2  Page 1 of 1
APPLICATION NO. : 10/609382
DATED : March 22, 2005
INVENTOR(S) : Kwok Sing Cheng et al.

It is certified that error appears in the above-identified patent and that said Letters Patent is hereby corrected as shown below:

Title Page
Item (75), Inventors, "Kwok Sing Cheng, New Territories (HK); Yeung Ming Alice Chow, New Territories (HK); Wai Ming Edwin Cheung, Tai Po (HK); Fuk Kay Franklin Tong, New Territories (HK); Hing Wa Flora Ho, Kowloon (HK); Allan Hui, Shatin (HK); Nelson Lau, Kowloon (HK); Ka Suen Lee, Kowloon (HK); Chi Hung Lin, Kowloon (HK); Chi Yue Raymond Cheung, Kowloon (HK); Chun Wah Colin Fan, Pokfulam (HK)"

should read

-- Kwok Sing Cheng, New Territories (HK); Yeung Ming Alice Chow, New Territories (HK); Wai Ming Edwin Cheung, Tai Po (HK); Fuk Kay Franklin Tong, New Territories (HK); Hing Wa Flora Ho, Kowloon (HK); Allan Hui, Shatin (HK); Nelson Lau, Kowloon (HK); Ka Suen Lee, Kowloon (HK); Chi Hung Lin, Kowloon (HK); Chi Yue Raymond Cheung, Kowloon (HK); Chun Wah Colin Fan, Pokfulam (HK); S.K. Lam, Kowloon (HK) --

Signed and Sealed this

Thirty-first Day of March, 2009

JOHN DOLL
*Acting Director of the United States Patent and Trademark Office*